United States Patent [19]

Voisine et al.

[11] Patent Number: 5,527,372
[45] Date of Patent: Jun. 18, 1996

[54] PUSHER MECHANISM FOR I.S. GLASS FORMING MACHINE

[75] Inventors: Gary R. Voisine, Hartford; Douglas J. Roberts, Ellington; Vaughan Abbott, East Hartland, all of Conn.

[73] Assignee: Emhart Glass Machinery Investments Inc., Wilmington, Del.

[21] Appl. No.: 296,065

[22] Filed: Aug. 24, 1994

[51] Int. Cl.$^6$ .................................................. C03B 9/453
[52] U.S. Cl. ............................... 65/260; 65/239; 65/241; 414/752; 294/64.3; 294/64.2; 294/64.1
[58] Field of Search ............................ 414/752; 65/239, 65/241, 260; 294/64.3, 64.2, 64.1

[56] References Cited

U.S. PATENT DOCUMENTS 4,502,721  3/1985  Savin-Czeizler et al. .............. 294/1.1
4,927,444  5/1990  Voisine ..................................... 65/323
5,066,055  11/1991  Guyard ..................................... 294/1.1

Primary Examiner—Donald E. Czaja
Assistant Examiner—Sean Vincent
Attorney, Agent, or Firm—Spencer T. Smith

[57] ABSTRACT

A pusher has one or more pockets for receiving glass containers like bottles. Each pocket is defined by a corner between a finger and a side portion. To positively locate the bottles in their pockets, a jet of air is directed at each bottle proximate the heel in a direction from the finger surface towards the corner so that the bottle will be forcefully pulled into the corner and held there.

14 Claims, 2 Drawing Sheets

PUSHER MECHANISM FOR I.S. GLASS FORMING MACHINE

BACKGROUND OF THE INVENTION

The present invention relates to machinery for manufacturing glass containers, and specifically, to pusher mechanism which transfer glass containers deposited on a dead plate of an individual section machine to a moving conveyor which will deliver the containers to a Lehr.

In state of the art multi-container pushers, a pneumatic cylinder extends a container handling arm, having a plurality of L-shaped pockets, to a container receiving location. Formed containers are deposited proximate these pockets on a dead plate and air under pressure is directed toward the containers either by a pocket air distributor secured to the dead plate opposite the container handling arm or by air jets which direct pressurized air against the side of the container furthest away from the corner against which it will be located.

SUMMARY OF THE INVENTION

It is an object of the present invention to provide a mechanism which will more effectively locate the containers in their pockets and which will better maintain them so located during rotational displacement of the pusher as it transfers the containers from the dead plate to the conveyor.

Other objects and advantages of the present invention will become apparent from the following portion of this specification and from the accompanying drawings which illustrate in accordance with the mandate of the patent statutes a presently preferred embodiment incorporating the principles of the invention.

DESCRIPTION OF THE PREFERRED EMBODIMENTS

Figure 1:
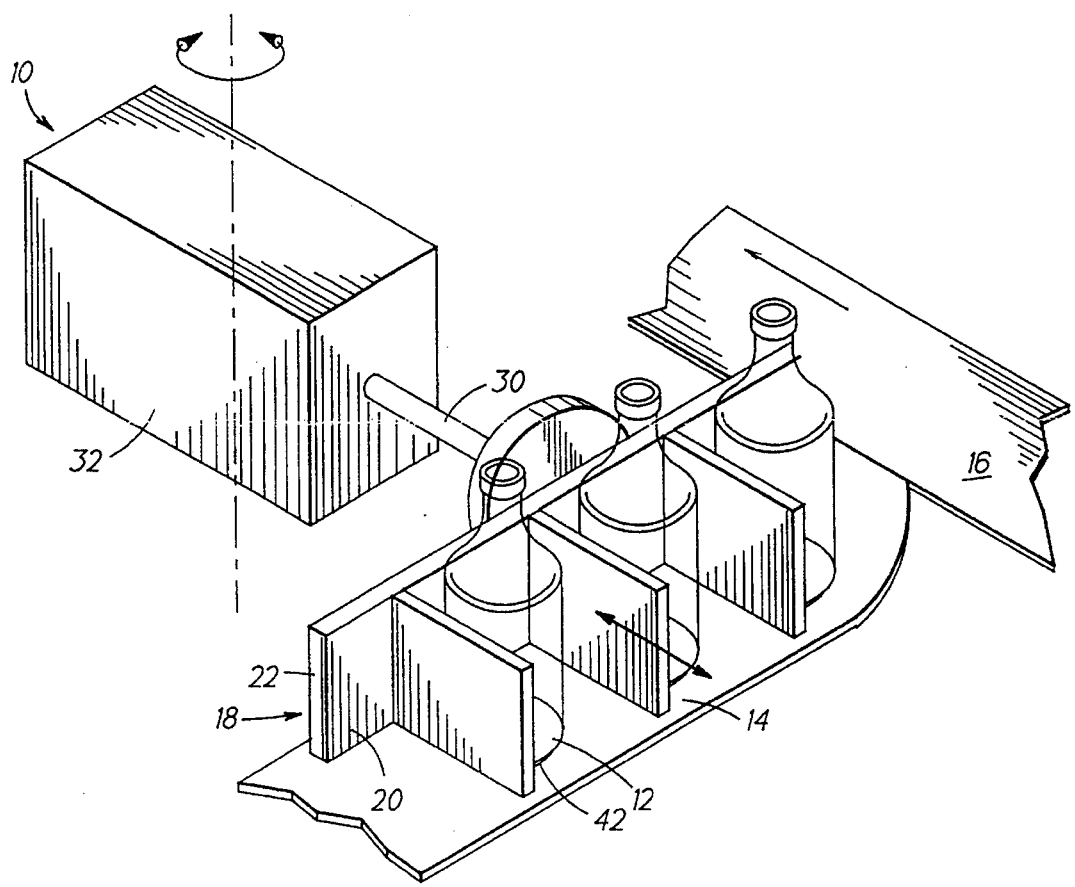
FIG. 1 is an oblique view of a portion of a pusher mechanism made in accordance with the teachings of the present invention.
Figure 2:
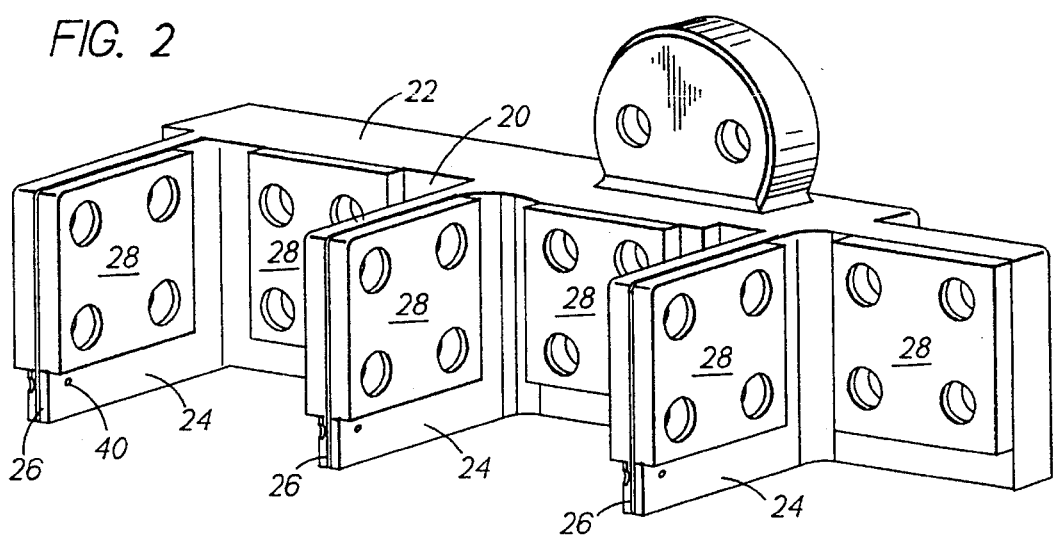
FIG. 2 is an oblique view of the finger assembly of the pusher mechanism shown in FIG. 1.
Figure 3:
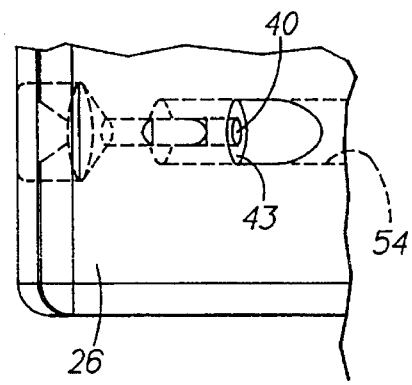
FIG. 3 is an enlarged view of one of the outside corners of a finger on the finger assembly.
Figure 4:
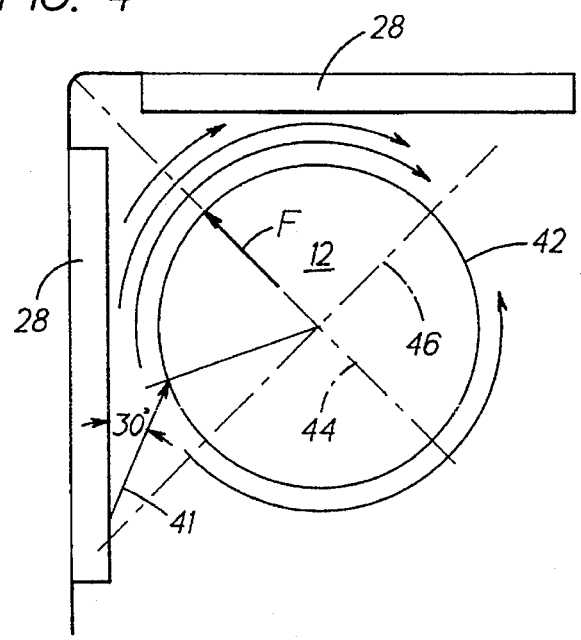

FIG. 4 schematically illustrates how the invention operates; and

Figure 5:
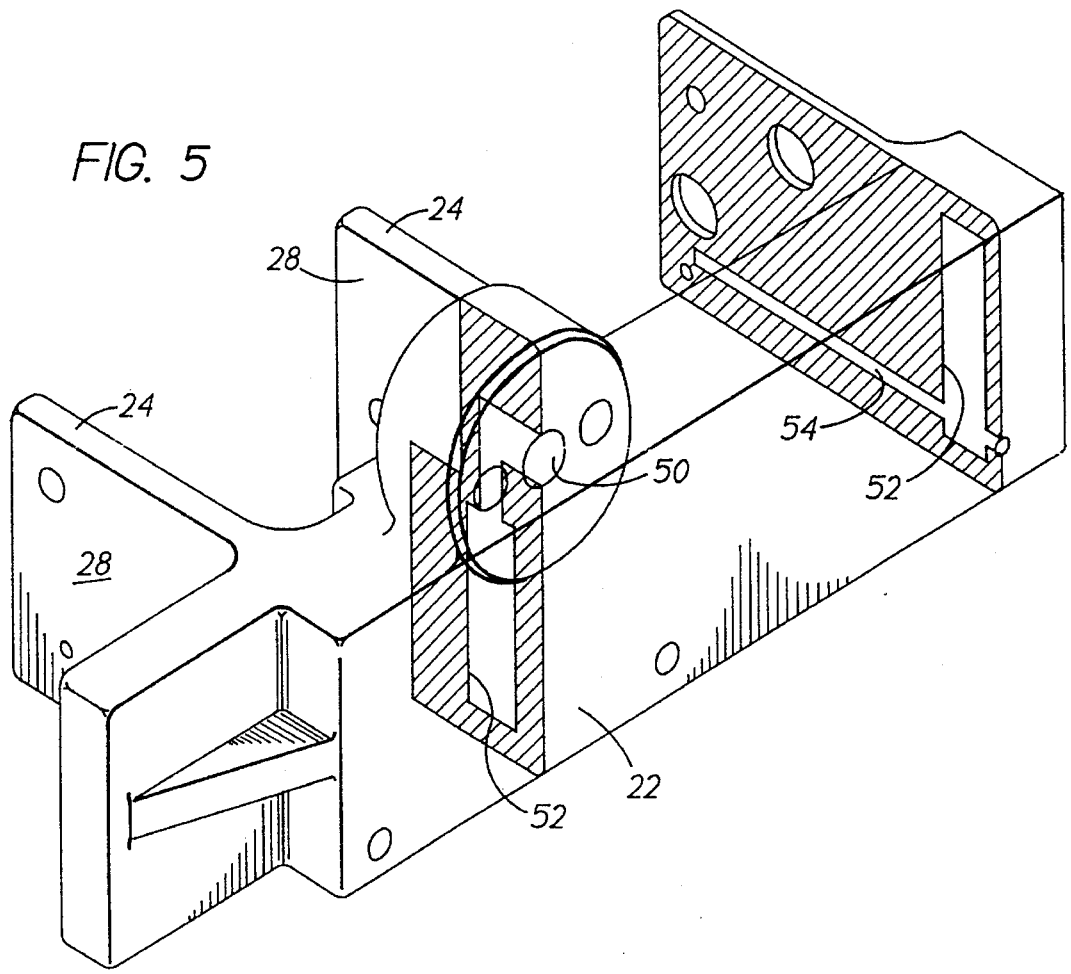

FIG. 5 is another oblique view of the finger assembly with selected sections illustrating air flow within the finger assembly.

A pusher mechanism 10 is used to push glass containers 12 (while a cylindrical bottle is shown, the bottle may also be oval, square cornered or flask shape) made in one section of an I.S. (individual section) machine from a dead plate 14 to a transversely moving conveyor 16. Each container ideally becomes located in a pocket of the finger assembly 18 defined by the front surface 20 of a side wall 22 and the forward face 24 of a finger 26. These bottle engagement surfaces are generally covered with a suitable pad 28 to minimize damage to the containers. The finger assembly is secured to the advanceable rod 30 of a cylinder mechanism supported within a suitable housing 32 and the housing 32 is supported for rotation so that the finger assembly can be rotated to locate the bottles in line on the conveyor. The number of pockets will correspond to the number of containers being made in each section of the I.S. machine. As illustrated, the I.S. machine has a triple gob configuration since the finger assembly has three pockets for receiving three containers. In practice, the I.S. machine could be single, double or quadruple gob, as well.

At the free end of each finger 26, on the front surface 24 thereof, is defined an air passage 40 which jets pressurized air horizontally at the heel 42 of a container. In the preferred embodiment, this air passage 40 is drilled square to a larger circular surface 43, which is defined in a milling or counterboring operation along the desired axis of the air passage from the outer surface of the finger 26. FIG. 4 shows a container deposited at a possible location relative to a pocket defined by a pair of pads 28. Line 44 extends through the corner of the pocket and through the axis of the container and line 46 passes through the axis of the container transversely to line 44. Line 46 will be referred to as the transverse diameter and the inward direction will refer to air flow from the jet between the corner of the pocket and the transverse diameter. As can be seen from FIG. 4, the pocket air jet 41 leaving air passage 40 makes an angle of about 30° with the rear pad 28 and strikes the container inwardly of the transverse diameter. As shown in FIG. 4, while some air passes counterclockwise around the container, the jet is aimed so that most jetted air travels clockwise around the container and pulls (force F) the container into and holds the container against the pocket.

Factory air (air under a pressure of about 30 to 45 PSI), which can be varied at a conventionally provided manifold by adjusting a regulator to suit the weight and shape of the bottle, is supplied through the rod 30, through an inlet 50, to a cross-manifold 52 which supplies cross-bores 54 extending through each finger to communicate with its associated oblique air passage 40. Line pressure to the rod will be timed on and off as required.

We claim:

1. A pusher mechanism for transferring a selected number of containers from a dead plate of an I.S. glass forming machine to a conveyor comprising a finger assembly having
a side portion, and
a corresponding number of fingers extending transversely from said side portion and defining with said side portion a corresponding number of container receiving pockets,
each of said fingers defining a pocket corner at said side portion for engaging a container,
each of said fingers including a pressurized air discharge passage communicating with the surface of said finger aimed to direct air under pressure against a container located within its pocket at a location inwardly of the transverse diameter of the container so that more air will flow inwardly towards the pocket corner around the container than outwardly away from the corner around the container whereby the container will be forced into said pocket, and
wherein said side portion further includes an air manifold and each of said fingers includes a cross-bore connecting said air discharge passage and said manifold.

2. A pusher mechanism according to claim 1, wherein said pressurized air discharge passage is aimed at the heel of the container.

3. A pusher mechanism according to claim 1, wherein each of said air discharge passages is perpendicular to the surface of said finger with which it communicates.

4. A pusher mechanism according to claim 1, wherein said side portion further includes an air inlet communicating with said air manifold.

5. A pusher mechanism according to claim 1, wherein each of said air discharge passages makes an angle of about 30° with said finger.

6. A manipulator for transferring a selected glass container from a first location along an arcuate path to a second location comprising a pocket assembly having
a side portion, and
a finger extending transversely from said side portion and defining with said side portion a container receiving pockets,
said finger defining a pocket corner at said side portion for engaging a container,
said finger including a pressurized air discharge passage communicating with the surface of said finger aimed to direct air under pressure against a container located within its pocket at a location inwardly of the transverse diameter of the container so that more air will flow inwardly towards the pocket corner around the container than outwardly away from the corner around the container whereby the container will be forced into said pocket and held therein as the manipulator transfers the container from said first location to said second location.

7. A manipulator according to claim 6, wherein said pressurized air discharge opening is aimed at the heel of the container.

8. A pusher mechanism for transferring a selected number of containers from a dead plate of an I.S. glass forming machine to a conveyor comprising a finger assembly having a side portion,
a corresponding number of fingers extending transversely from said side portion and defining with said side portion a corresponding number of container receiving pockets each having a bottom,
each of said fingers defining a pocket corner at said side portion for engaging a container,
each container receiving pocket including a container engaging pad on the finger and a container engaging pad on the side portion, said container engaging pads having a bottom spaced from the bottom of its container receiving pocket,
each of said fingers including a pressurized air discharge passage communicating with the surface of said finger at a location between the bottom of the pocket including said finger and the bottom of the container engaging pad on said finger and aimed to direct air under pressure against a container located within its pocket at a location inwardly of the transverse diameter of the container so that more air will flow inwardly towards the pocket corner below the container engaging pad on the finger around the container, than outwardly away from the corner around the container below the container engaging pad on the side portion whereby the container will be forced into said pocket.

9. A pusher mechanism according to claim 8, wherein said pressurized air discharge passage is aimed at the heel of the container.

10. A pusher mechanism according to claim 9, wherein said side portion further includes an air manifold and each of said fingers includes a cross-bore connecting said air discharge passage and said manifold.

11. A manipulator for transferring a selected glass container from a first location along an arcuate path to a second location comprising a finger assembly having a side portion,
a corresponding number of fingers extending transversely from said side portion and defining with said side portion a corresponding number of container receiving pockets each having a bottom,
each of said fingers defining a pocket corner at said side portion for engaging a container,
each container receiving pocket including a container engaging pad on the finger and a container engaging pad on the side portion, said container engaging pads having a bottom spaced from the bottom of its container receiving pocket,
each of said fingers including a pressurized air discharge passage communicating with the surface of said finger at a location between the bottom of the pocket including said finger and the bottom of the container engaging pad on said finger and aimed to direct air under pressure against a container located within its pocket at a location inwardly of the transverse diameter of the container so that more air will flow inwardly towards the pocket corner below the container engaging pad of the finger and around the container, than outwardly away from the corner around the container below the container engaging pad on the side portion whereby the container will be forced into said pocket.

12. A manipulator according to claim 11, wherein said pressurized air discharge passage is aimed at the heel of the container.

13. A pusher mechanism for transferring a selected number of containers from a dead plate of an I.S. glass forming machine to a conveyor comprising a finger assembly having
a side portion, and
a corresponding number of fingers extending transversely from said side portion and defining with said side portion a corresponding number of container receiving pockets,
each of said fingers defining a pocket corner at said side portion for engaging a container,
each of said fingers including a pressurized air discharge passage communicating with the surface of said finger aimed to direct air under pressure against a container located within its pocket at a location inwardly of the transverse diameter of the container so that more air will flow inwardly towards the pocket corner around the container than outwardly away from the corner around the container whereby the container will be forcefully displaced into engagement with said pocket.

14. A pusher mechanism according to claim 13, wherein said pressurized air discharge passage is aimed at the heel of the container.

* * * * *